United States Patent [19]
Hong

[11] Patent Number: 5,987,533
[45] Date of Patent: Nov. 16, 1999

[54] AUTOMATICALLY CONFIGURING SCSI DEVICE ADDRESSES USING SCSI CONTROLLER STORING PREDETERMINED ID AND, PRODUCING ADDRESS SIGNALS FOR TRANSFERRING TO PERIPHERAL DEVICE VIA SCSI ID INPUT MEANS

[75] Inventor: Bum Ryong Hong, Seoul, Rep. of Korea

[73] Assignee: SamSung Electronics Co., Ltd., Suwon, Rep. of Korea

[21] Appl. No.: 08/895,499

[22] Filed: Jul. 16, 1997

[30] Foreign Application Priority Data

Jul. 16, 1996 [KR] Rep. of Korea ...................... 96/28795

[51] Int. Cl.$^6$ ............................. G06F 13/10; G06F 13/12
[52] U.S. Cl. .................................... 710/9; 710/8; 710/62; 710/64
[58] Field of Search .................................... 375/275, 829, 375/884; 710/1, 8, 9, 62, 64

[56] References Cited

U.S. PATENT DOCUMENTS

| | | | |
|---|---|---|---|
| 4,964,038 | 10/1990 | Louis et al. | 364/200 |
| 5,175,822 | 12/1992 | Dixon et al. | 395/275 |
| 5,239,632 | 8/1993 | Larner | 395/325 |
| 5,283,872 | 2/1994 | Ohnishi | 395/325 |
| 5,367,647 | 11/1994 | Coulson et al. | 395/325 |
| 5,497,466 | 3/1996 | Roden et al. | 395/306 |
| 5,511,227 | 4/1996 | Jones | 395/829 |
| 5,530,831 | 6/1996 | Akiyama et al. | 395/441 |
| 5,530,895 | 6/1996 | Enstrom | 395/829 |
| 5,530,896 | 6/1996 | Gilbert | 395/829 |
| 5,535,336 | 7/1996 | Smith et al. | 395/200.06 |
| 5,551,053 | 8/1996 | Nadolski et al. | 395/829 |
| 5,613,158 | 3/1997 | Savage | 395/829 |
| 5,664,221 | 9/1997 | Amberg et al. | 395/829 |
| 5,787,306 | 7/1998 | Michael | 395/829 |

*Primary Examiner*—Thomas C. Lee
*Assistant Examiner*—Rehana Perveen
*Attorney, Agent, or Firm*—Robert E. Bushnell, Esq.

[57] ABSTRACT

A SCSI bus-based mass storage system for automatically setting the addresses of a plurality of disk devices includes a SCSI controller for providing predetermined SCSI address signals including addresses data for each peripheral device, and a SCSI ID input device which receives and stores and forwards the corresponding SCSI address ID to the peripheral devices for setting the SCSI ID of addressable peripheral devices. The SCSI controller includes an N-bit shift register having a serial output for providing the SCSI address signals, and a counter for providing the clock signals. Further, the SCSI ID input device includes a plurality of M-bit shift registers which correspond to the number of addressable peripheral devices, where M corresponds to the number of SCSI ID setting jumpers provided in the peripheral devices. Since a manual jumper setting for the SCSI ID can be avoided, faster and more convenient use of the SCSI devices is possible when one or more SCSI devices are added to the computer system.

16 Claims, 4 Drawing Sheets

AUTOMATICALLY CONFIGURING SCSI DEVICE ADDRESSES USING SCSI CONTROLLER STORING PREDETERMINED ID AND, PRODUCING ADDRESS SIGNALS FOR TRANSFERRING TO PERIPHERAL DEVICE VIA SCSI ID INPUT MEANS

CLAIM OF PRIORITY

This application makes reference to, incorporates the same herein, and claims all benefits accruing under 35 U.S.C. § 119 from an application for AUTO CONFIGURATION OF SCSI DEVICE ADDRESSES earlier filed in the Korean Industrial Property Office on Jul. 16, 1996 and there duly assigned Ser. No. 28795/1996, a copy of which application is annexed hereto.

BACKGROUND OF THE INVENTION

1. Field of the Invention

The present invention relates to peripheral control systems in a computer system, and more particularly to an apparatus for automatically setting the addresses of a large number of disk devices using a Small Computer System Interface (SCSI) bus.

2. Description of the Related Art

Disk drives and controllers for personal computers have been developed that utilize the SCSI bus standard for control and transfer of data to be stored. SCSI bus-based mass storage systems typically use a large number of disk drives to achieve the required data capacities. As is well known, the SCSI serial interface takes roles of a connection path that transfers commands issued by the computer to many peripheral devices. The controlling of the peripheral device is performed by the controller embedded in the same peripheral device. Therefore, the SCSI interface acts like a "network card" and provides features of error detection and restoration, detecting and controlling of data collision, and communication with the other devices. Also, there are benefits to distributing data across a large number of smaller capacity drives including faster average access time, higher data transfer rate (usually 8~40 Mbyte/sec), improved mass storage system reliability, and reduced data loss in the event of a drive failure.

In an earlier SCSI bus-based mass storage system, a SCSI bus interconnects a SCSI controller with peripheral devices. The SCSI controller includes a host adaptor which is in communication with a computer, and the peripheral devices commonly include their own controllers In this storage system, the peripheral devices are usually hard disk drives, and may include CD-ROM drives. According to the SCSI-I standard, only eight device addresses are possible, that is, one host controller and seven peripheral devices. If more than seven peripheral devices are required, multiple host controllers must be added to the mass storage system. Meanwhile, those peripheral devices (hereinafter "SCSI devices" or "devices") report their SCSI address ID to the computer system via the SCSI bus in the computer booting process. Each SCSI address ID is set by a jumper setting and therefore the SCSI devices commonly include jumper setting blocks. Each jumper setting block usually has a 3-bit jumper block. Therefore, in the event of adding an SCSI device in the computer system, it is difficult for users to set the SCSI address ID by hand, and the jumper setting procedure required at every addition of the SCSI device is annoying and time-consuming.

To overcome the limitation of the number of SCSI devices, the SCSI-II standard has been established which allows the device addressing to be increased to a limit of sixteen devices. Further, a method for sharing device addresses between different devices on the SCSI bus to thereby increase the number of devices that can utilize the bus has been disclosed in U.S. Pat. No. 5,367,647 of Coulson et al. The sharing is SCSI address ID number between the SCSI host adaptor and a SCSI device controller on the bus.

While the number of addressable SCSI devices is remarkably increased, the manual jumper setting for the SCSI address ID and serviceability problems remain.

The Dixon et al., Jones and Savage patents, U.S. Pat. Nos. 5,175,822, 5,511,227, and 5,613,158, respectively entitled Apparatus And Method For Assigning Addresses To SCSI Supported Peripheral Devices, Method For Configuring A Composite Drive For A Disk Drive Array Controller, and System For Specifying Addresses By Creating A Multi-Bit Ranked Ordered Anchor Pattern And Creating Next Address By Shifting In The Direction Of The Superior Position, each disclose techniques for assigning addresses to devices on a SCSI bus. However none of these patents teaches or suggests the specific apparatus of the present invention.

The following patents each discloses features in common with the present invention but are not as pertinent as the three patents noted above: U.S. Pat. No. 5,283,872 to Ohnishi, entitled SCSI Device Having Transfer Parameter Storage Memory Blocks Which Correspond To Each Apparatus, U.S. Pat. No. 5,530,831 to Akiyama et al., entitled Interchangeable Extension Board Disk Array System, U.S. Pat. No. 5,530,895 to Enstrom, entitled System And Method For Computer Interface Board Identification By Serially Comparing Identification Address Bits And Asserting complementary Logic Patterns For Each Match, U.S. Pat. No. 5,530,896 to Gilbert, entitled Appliance Control Process For Matching Slave Units To Control Units And For Automatically Assigning Addresses To The Slave Units, U.S. Pat. No. 5,535,336 to Smith et al; entitled Apparatus And Method For Enabling A Network Interface To Dynamically Assign An Address To A Connected Computer And To Establish A Virtual Circuit With Another Network Interface, U.S. Pat. No. 5,551,053 to Nadolski et al., entitled System And Method For Assigning Addresses To I/O Devices In A Control Network And For Verifying The Assigned Address Of The Devices, U.S. Pat. No. 4,964,038 to Louis et al.,entitled Data Processing System Having Automatic Address Allocation Arrangements For Addressing Interface Cards, U.S. Pat. No. 5,497,466 to Roden et al., entitled Universal Address Generator, and U.S. Pat. No. 5,239,632 to Lamer, entitled Device To Translate Logical Unit Number Communications On One SCSI Bus To ID Communications On A Subordinate SCSI Bus.

SUMMARY OF THE INVENTION

It is therefore an object of the invention to configure the addresses of SCSI devices without separate setting of the jumper blocks in the SCSI device.

The present invention provides an apparatus in which signals including the SCSI address ID data can be supplied with a SCSI ID input means in synchronism with the clock signals. The apparatus comprises a SCSI controller that stores predetermined SCSI ID data for addressable peripheral devices and produces a series of SCSI address signals when the computer is initialized. Also, a SCSI ID input means is provided for receiving the SCSI address signals and for storing the address ID data to be transferred to the SCSI ID jumper setting blocks of the peripheral devices in synchronism with the clock signals.

Preferably, the SCSI controller includes an N-bit shift register having a serial output for providing the shift register 76 of the SCSI address signals, and a counter for providing the clock signals. Further, the SCSI ID input means includes a plurality of M-bit shift registers which correspond to the number of addressable peripheral devices and the M corresponds to the number of SCSI ID setting jumpers provided in the peripheral devices.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
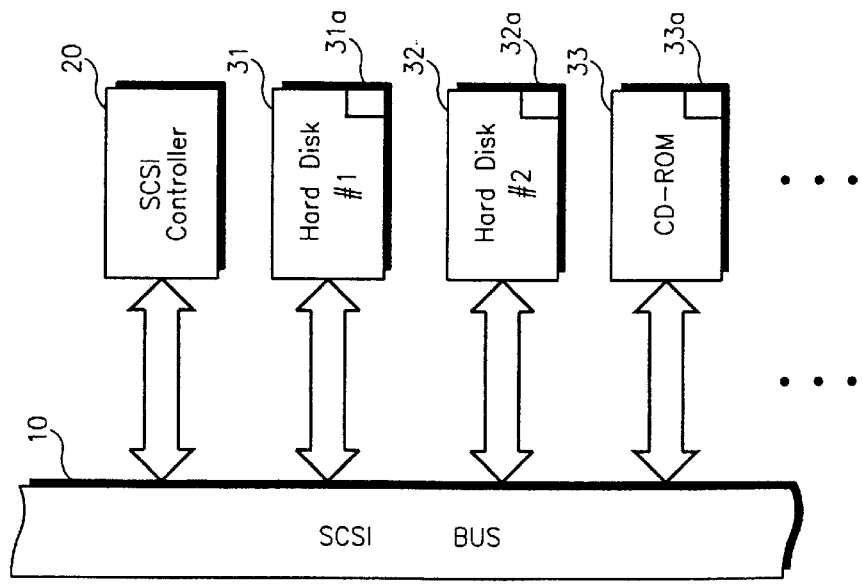
FIG. 1 is a block diagram illustrating the major elements of an earlier SCSI bus-based mass storage system.

FIG. 1 illustrates the major components of an earlier SCSI bus-based mass storage system as discussed in the Description of the Related Art above. A SCSI bus 10 interconnects a SCSI controller 20 with peripheral devices 31, 32, and 33. Each peripheral device 31–33 has jumper setting block 31a, 32a and 33a as shown in FIG. 1.

Figure 2:
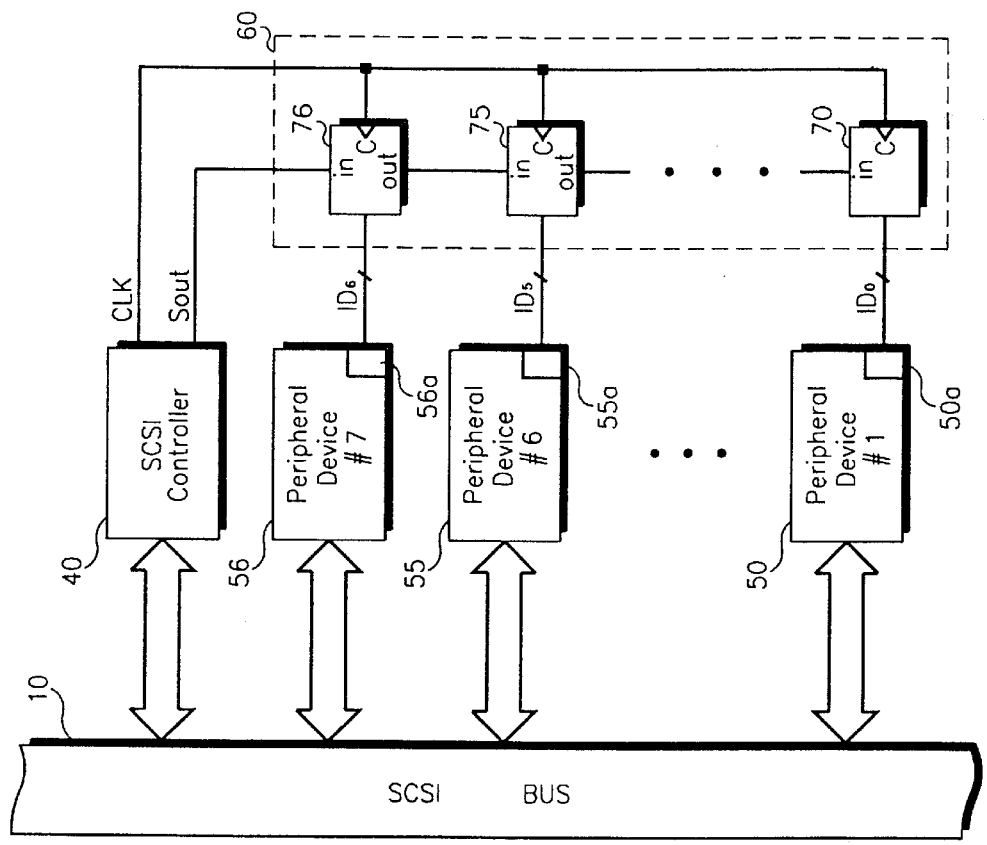
FIG. 2 is a block diagram illustrating the major elements of a SCSI bus-based mass storage system including SCSI ID input means and SCSI controller according to this invention.
Figure 3:
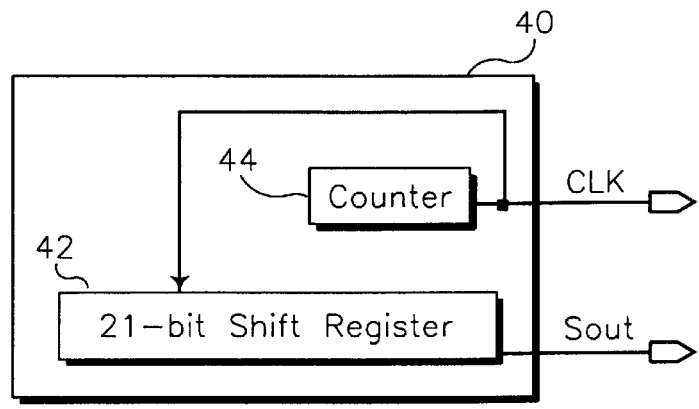
FIG. 3 is a block diagram depicting the major part of the SCSI controller as shown in FIG. 2.
Figure 4:
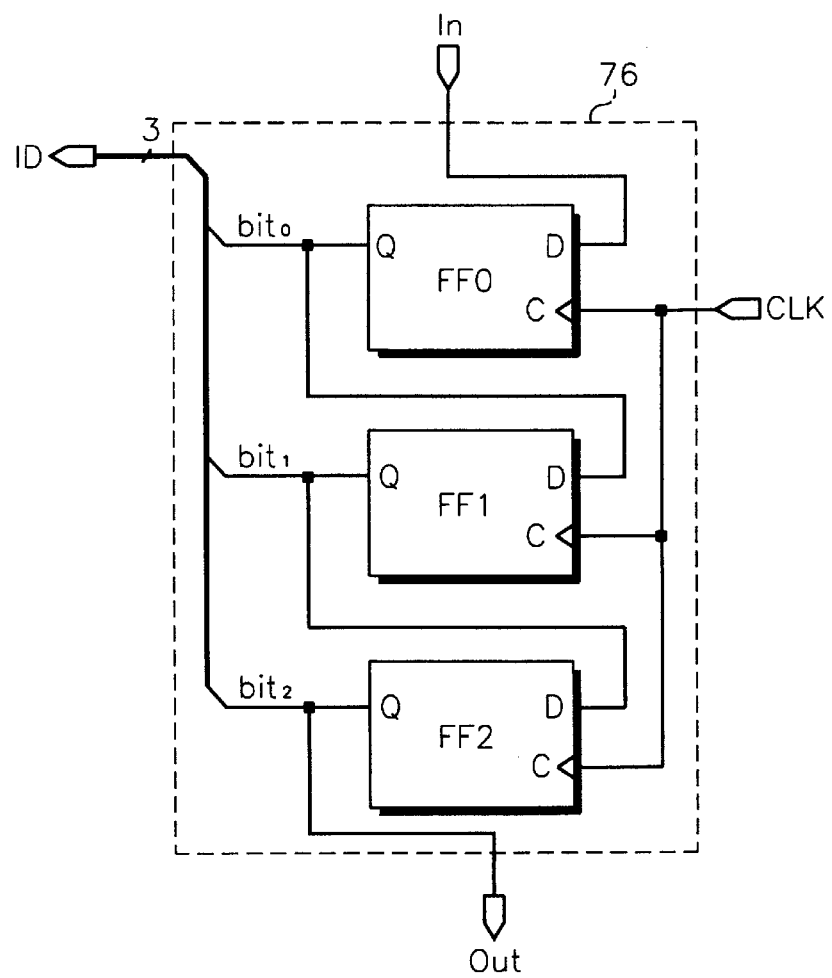
FIG. 4 is a block diagram of the SCSI ID input means of FIG. 2.

Referring to drawings where like reference numerals designate identical or corresponding parts throughout the several views, and more particularly to FIG. 2, there is shown a SCSI bus-based mass storage system for automatically setting the addresses of a plurality of disk devices in accordance with the teaching of the present invention. The storage system includes a SCSI controller 40 that provides predetermined SCSI address signals including addresses data for each peripheral device, and a SCSI ID input means 60 which distributes the corresponding SCSI address ID to the peripheral devices for setting the SCSI address ID of the addressable SCSI devices. FIG. 3 shows the major part of the SCSI controller 40, and FIG. 4 shows detail of the SCSI ID input means 60 of FIG. 2. The preferred embodiment of the present invention will be described in detail with reference to FIGS. 2 to 4.

In FIG. 2, the mass storage system comprises a SCSI bus 10, a SCSI controller 40, a plurality of peripheral devices 50~56, and SCSI ID input means 60. As with the system shown in FIG. 1, the SCSI bus 10 interconnects a SCSI controller 40 with the peripheral devices 50~56. Further, the SCSI controller 40 includes a host adaptor which is in communication with a computer. The peripheral devices 50~56 are usually hard disk drives and CD-ROM drives and commonly include their own controllers. An apparatus for automatically setting the addresses of the peripheral devices 50~56 according to this invention comprises the SCSI controller 40 and the SCSI ID input means 60. The SCSI controller 40 provides at the respective outputs thereof the SCSI address signals (Sout) and clock signals (CLK), fed to the SCSI ID input means 60.

As shown in FIG. 3, the SCSI controller 40 includes a 21-bit shift register 42 for storing the SCSI addresses data, and a counter 44 for producing synchronizing signals CLK such as a clock signal. The SCSI ID input means 60 also includes a plurality of M-bit shift registers 70~76 corresponding to the number of addressable peripheral devices. In this storage system, for example, seven peripheral devices 50~56 are installed according to the SCSI-I standard and seven shift registers 70~76 are provided to correspond therewith. Further, the shift registers 70~76 commonly include 3-bit shift registers as shown in FIG. 4. Each 3-bit shift register consists of three D type flip-flops having their D inputs and Q outputs connected serially. The SCSI address signal line (Sout) from the SCSI controller 40 is connected to the input terminal (In) of one shift register 76, and the output terminal (Out) is connected to the input terminal of the other shift register 75. Thus, a serial connection is made across seven shift registers 70~76 of the SCSI ID input means 60 with regard to their input and output terminals. The clock signal line (CLK) is also commonly fed to the clock input terminals of the shift registers 70~76.

Outputs of the 3-bit shift registers 70~76 are connected to the SCSI ID jumper setting blocks 50a~56a of the same SCSI devices 50~56. That is, three output lines of each shift register are coupled to the three SCSI ID jumpers of each SCSI ID jumper setting blocks 50a~56a, as shown in FIG. 2.

Figure 5:
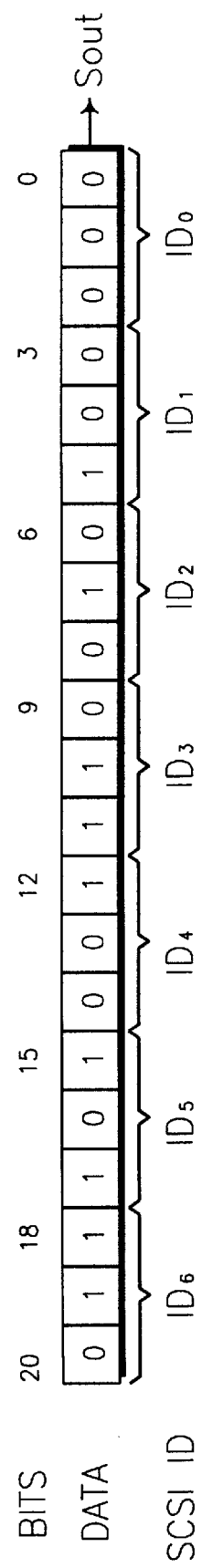
FIG. 5 is a diagram showing an example of data assignment in the 21-bit shift register of FIG. 3.

Referring to FIG. 5, there is shown, for example, an assignment of data stored in the 21-bit shift register 42 of the SCSI controller 40. From LSB to MSB, a consecutive 3-bit binary data corresponds to decimals 0 to 6 are assigned thereto. Further, the 3-bit data, $ID_0$~$ID_6$ will be used as a device address for the peripheral devices 50~56 in the SCSI bus-based storage system. Each of the data bits are outputted as the SCSI address signals (Sout) at every input of the clock signals CLK fed from the counter 44.

In this arrangement, the operation of automatically setting the SCSI device addresses as follows:

When booting or resetting of the computer is started, the SCSI controller 40 performs a self-test and initializes the SCSI bus 10. During the initializing or resetting of the SCSI-bus, the automatic setting of the SCSI address is performed. As previously mentioned, the 3-bit data $ID_0$~$ID_6$ stored in the 21-bit shift register 42 of the SCSI controller 40 is serially outputted as the SCSI address signals (Sout) to the SCSI ID input means 60. The SCSI ID input means 60 receives the address data $ID_0$~$ID_6$ in synchronism with the clock signals CLK.

Figure 6:
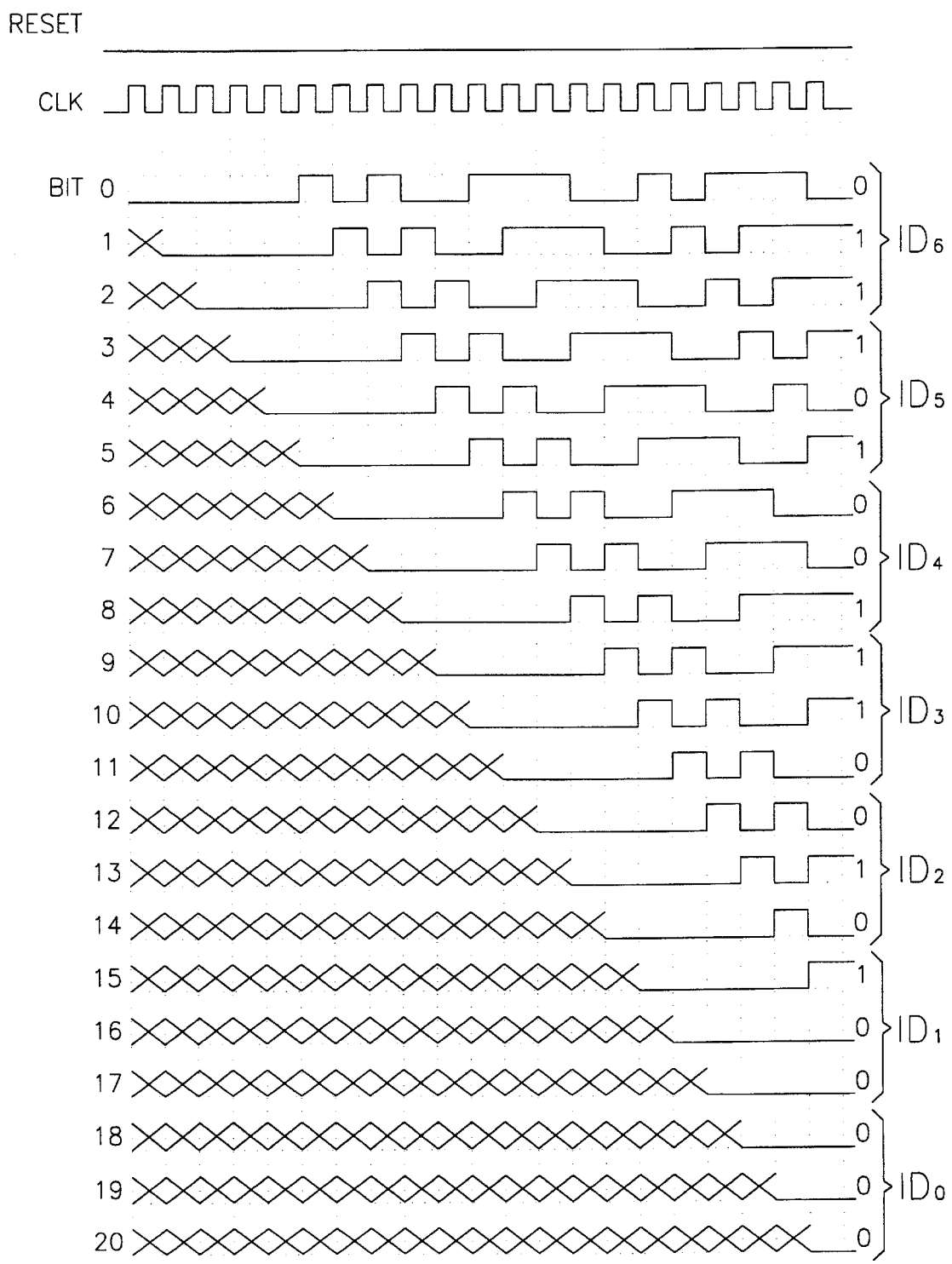
FIG. 6 is a timing chart showing output waveforms of the SCSI ID input means.

Referring to FIG. 6, when the 21 st clock signal has occurred during the initialization period, the address data $ID_0$~$ID_6$ are shifted in the 3-bit shift registers 70~76, and each 3-bit data is stored into the corresponding shift registers 70~76. The output data of each shift register 70~76 is transferred to the SCSI ID jumper blocks 50a~56a of the peripheral devices 50~56. The SCSI ID jumper blocks 50a~56a set the data stored in the corresponding shift registers 70~76 as the device address ID ($ID_0$~$ID_6$ of the same peripheral devices 50~56. Then, the peripheral devices 50~56 report their address ID to the SCSI bus 10. With this, the automatic set up of the SCSI device addresses is completed, and the computer is capable of recognizing the SCSI devices installed in the system.

As is apparent from foregoing, according to the present invention, as manual jumper setting for the SCSI device address ID can be avoided, faster and convenient use of the SCSI devices is possible when the SCSI device is added to the system. Also, the serviceability of the computer system can be effectively enhanced by using the apparatus of this invention.

While the invention has been described in terms of an exemplary embodiment, it is contemplated that it may be practiced as outlined above with modifications within the spirit and scope of the appended claims.

What is claimed is:

1. In a SCSI bus-based mass storage system having a SCSI bus, a SCSI controller including a host adaptor which is in communication with a computer, a plurality of peripheral devices including their own controllers and SCSI ID jumper setting blocks, wherein the SCSI bus interconnects the SCSI controller with the peripheral devices, an apparatus for automatically setting the SCSI address ID of the peripheral devices comprising:

the SCSI controller storing predetermined SCSI ID data for addressable peripheral devices and producing a series of SCSI address signals in synchronism with clock signals generated by the controller when the computer is initialized; and a SCSI ID input means for receiving the SCSI address signals and for storing the address ID data to be transferred to the jumper setting blocks of the peripheral devices in synchronism with the clock signals.

2. The apparatus as claimed in claim 1, the SCSI controller comprising an N-bit shift register having a serial output for providing the SCSI address signals, and a counter for providing the clock signals, N being an integer.

3. The apparatus as claimed in claim 1, the SCSI ID input means comprising a plurality of M-bit shift registers which correspond to the number of addressable peripheral devices, M being an integer.

4. The apparatus as claimed in claim 3, M corresponding to the number of SCSI ID setting jumpers provided in the peripheral devices.

5. The apparatus as claimed in claim 3, the M-bit shift registers comprising D-type flip-flops.

6. A SCSI bus-based mass storage system comprising:

a SCSI bus;

a SCSI controller including a host adaptor which is in communication with a computer;

a plurality of peripheral devices including their own controllers and SCSI ID setting blocks, the SCSI bus interconnecting the SCSI controller with the peripheral devices;

the SCSI controller storing predetermined SCSI ID data for addressable peripheral devices and producing a series of SCSI address signals in synchronism with clock signals generated by the controller when the computer is initialized; and a SCSI ID input means for receiving the SCSI address signals and for storing the address ID data to be transferred to the setting blocks of the peripheral devices in synchronism with the clock signals, the SCSI controller and SCSI ID input means together comprising an apparatus for automatically setting the SCSI address ID of the peripheral devices.

7. The system as claimed in claim 6, the SCSI controller comprising an N-bit shift register having a serial output for providing the SCSI address signals, and a counter for providing the clock signals, N being an integer.

8. The system as claimed in claim 6, the SCSI ID input means comprising a plurality of M-bit shift registers which correspond to the number of addressable peripheral devices, M being an integer.

9. The system as claimed in claim 8, M corresponding to the number of SCSI ID setting blocks provided in the peripheral devices.

10. The system as claimed in claim 8, the M-bit shift registers comprising D-type flip-flops.

11. A method of automatically setting the SCSI address ID of peripheral devices in a SCSI bus-base mass storage system having a SCSI bus, a SCSI controller including a host adaptor which is in communication with a computer, a plurality of peripheral devices including their own controllers and SCSI ID jumper setting blocks, the SCSI bus interconnecting the SCSI controller with the peripheral devices, the method comprising the steps of:

storing predetermined SCSI ID data for addressable peripheral devices in the SCSI controller and producing a series of SCSI address signals in synchronism with clock signals generated by the controller when the computer is initialized; and receiving the SCSI address signals and storing the address ID data to be transferred to the jumper setting blocks of the peripheral devices in synchronism with the clock signals in a SCSI ID input means.

12. A SCSI bus-base mass storage system comprising:

a SCSI bus;

a SCSI controller including a host adaptor which is in communication with a computer;

a plurality of peripheral devices including their own controllers and SCSI ID setting blocks, the SCSI bus interconnecting the SCSI controller with the peripheral devices;

the SCSI controller storing predetermined SCSI ID data for configurable peripheral devices and producing a series of SCSI ID signals in synchronism with clock signals generated by the controller when the computer is initialized; and a SCSI ID input means for receiving the SCSI ID signals and for storing the ID data to be transferred to the setting blocks of the peripheral devices in synchronism with the clock signals, the SCSI controller and SCSI ID input means together comprising an apparatus for automatically setting the SCSI ID of the peripheral devices.

13. The system as claimed in claim 12, the SCSI controller comprising an N-bit shift register having a serial output of providing the SCSI ID signals, and a counter for providing the clock signals, N being an integer.

14. The system as claimed in claim 12, the SCSI ID input means comprising a plurality of M-bit shift registers which correspond to the number of configurable peripheral devices, M being an integer.

15. The system as claimed in claims 14, the M corresponding to the number of SCSI ID setting blocks provided in the peripheral devices.

16. The system as claimed in claim 14, the M-bit shift registers comprising D-type flip-flops.

* * * * *